United States Patent
Todorovic et al.

(10) Patent No.: US 9,255,523 B2
(45) Date of Patent: Feb. 9, 2016

(54) FASTENING ELEMENT AND DE-ICING DEVICE OF AN AIRCRAFT GAS-TURBINE ENGINE

(71) Applicant: Rolls-Royce Deutschland Ltd & Co KG, Blankenfelde-Mahlow (DE)

(72) Inventors: Predrag Todorovic, Berlin (DE); Gustavo Araujo, Berlin (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 713 days.

(21) Appl. No.: 13/739,772

(22) Filed: Jan. 11, 2013

(65) Prior Publication Data

US 2013/0180227 A1    Jul. 18, 2013

(30) Foreign Application Priority Data

Jan. 18, 2012    (DE) .................. 10 2012 000 890

(51) Int. Cl.
*F02C 7/20* (2006.01)
*F02K 3/06* (2006.01)
*F02C 7/047* (2006.01)

(52) U.S. Cl.
CPC . *F02C 7/20* (2013.01); *F02C 7/047* (2013.01); *F02K 3/06* (2013.01); *Y02T 50/671* (2013.01); *Y10T 403/45* (2015.01)

(58) Field of Classification Search
CPC .............. F02C 7/20; F02C 7/047; F02C 7/32; B64D 2033/0233; B64D 15/04; F16L 3/133
USPC ...................................... 244/134 B
See application file for complete search history.

(56) References Cited

U.S. PATENT DOCUMENTS

| | | | |
|---|---|---|---|
| 3,194,590 A * | 7/1965 | Cook .............................. | 285/61 |
| 3,284,037 A | 11/1966 | Muller et al. | |
| 6,079,670 A | 6/2000 | Porte | |
| 2009/0152401 A1* | 6/2009 | Sternberger .............. | 244/134 B |
| 2010/0242428 A1 | 9/2010 | Vauchel et al. | |

FOREIGN PATENT DOCUMENTS

| | | |
|---|---|---|
| DE | 3936198 | 5/1990 |
| WO | 9418072 | 8/1994 |

OTHER PUBLICATIONS

German Search Report dated Nov. 5, 2012 from counterpart application.
European Search Report dated Nov. 17, 2014 for counterpart European Patent Application No. 13000192.8.

* cited by examiner

*Primary Examiner* — Devon Kramer
*Assistant Examiner* — Kenneth J Hansen
(74) *Attorney, Agent, or Firm* — Timothy J. Klima; Shuttleworth & Ingersoll, PLC

(57) ABSTRACT

The present invention relates to a fastening element, in particular to its use in a de-icing device of an aircraft gas-turbine engine, for connecting two components, with the fastening element ensuring a connection of the components with a predetermined relative movability to each other, with the fastening element including two struts arranged at an angle to each other, where two first end areas, spacedly arranged to each other, can be fastened to one of the components, and the two other second end areas can be connected to each other and fastened to the other component.

20 Claims, 3 Drawing Sheets

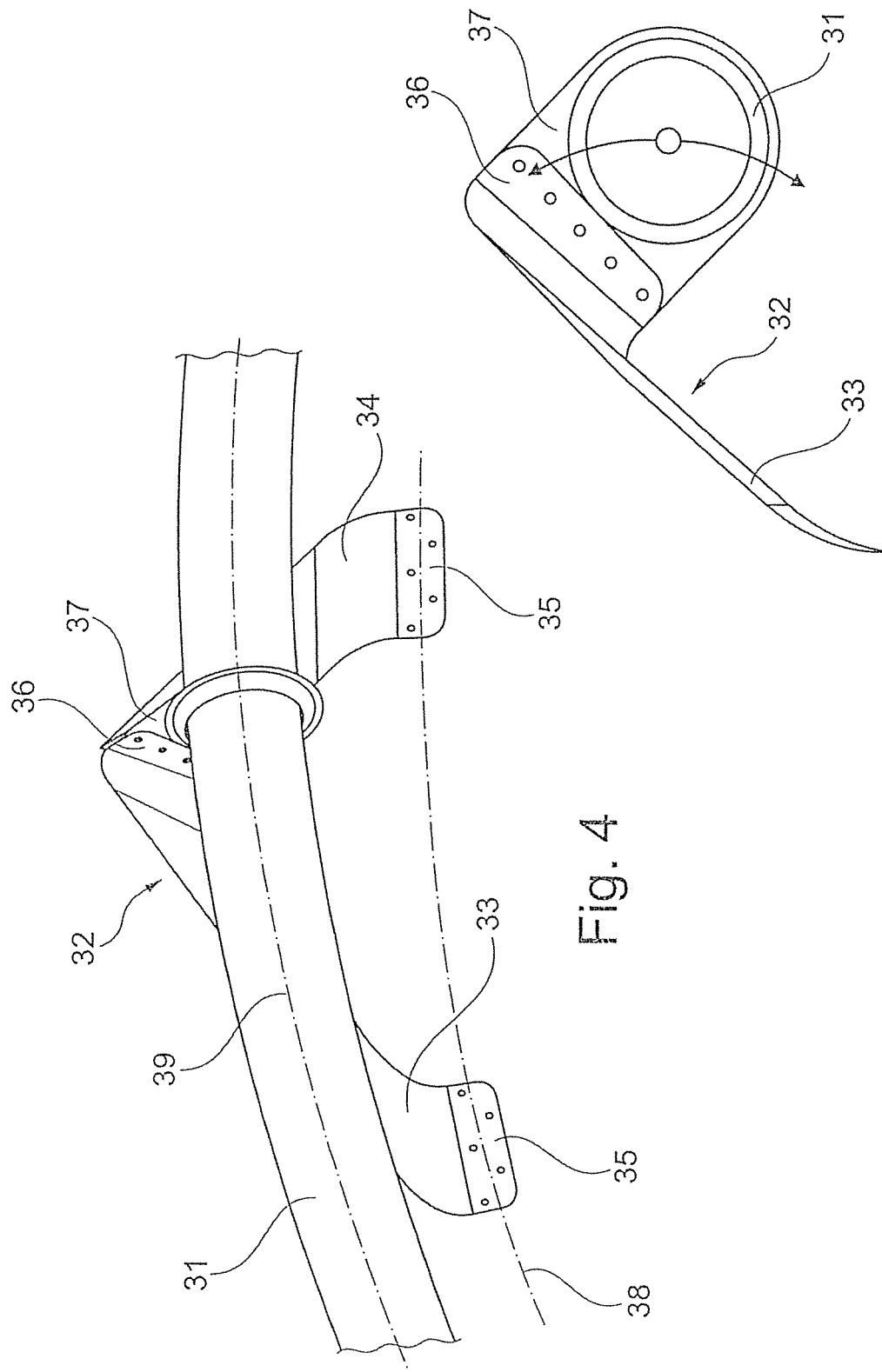

FASTENING ELEMENT AND DE-ICING DEVICE OF AN AIRCRAFT GAS-TURBINE ENGINE

Figure 1:
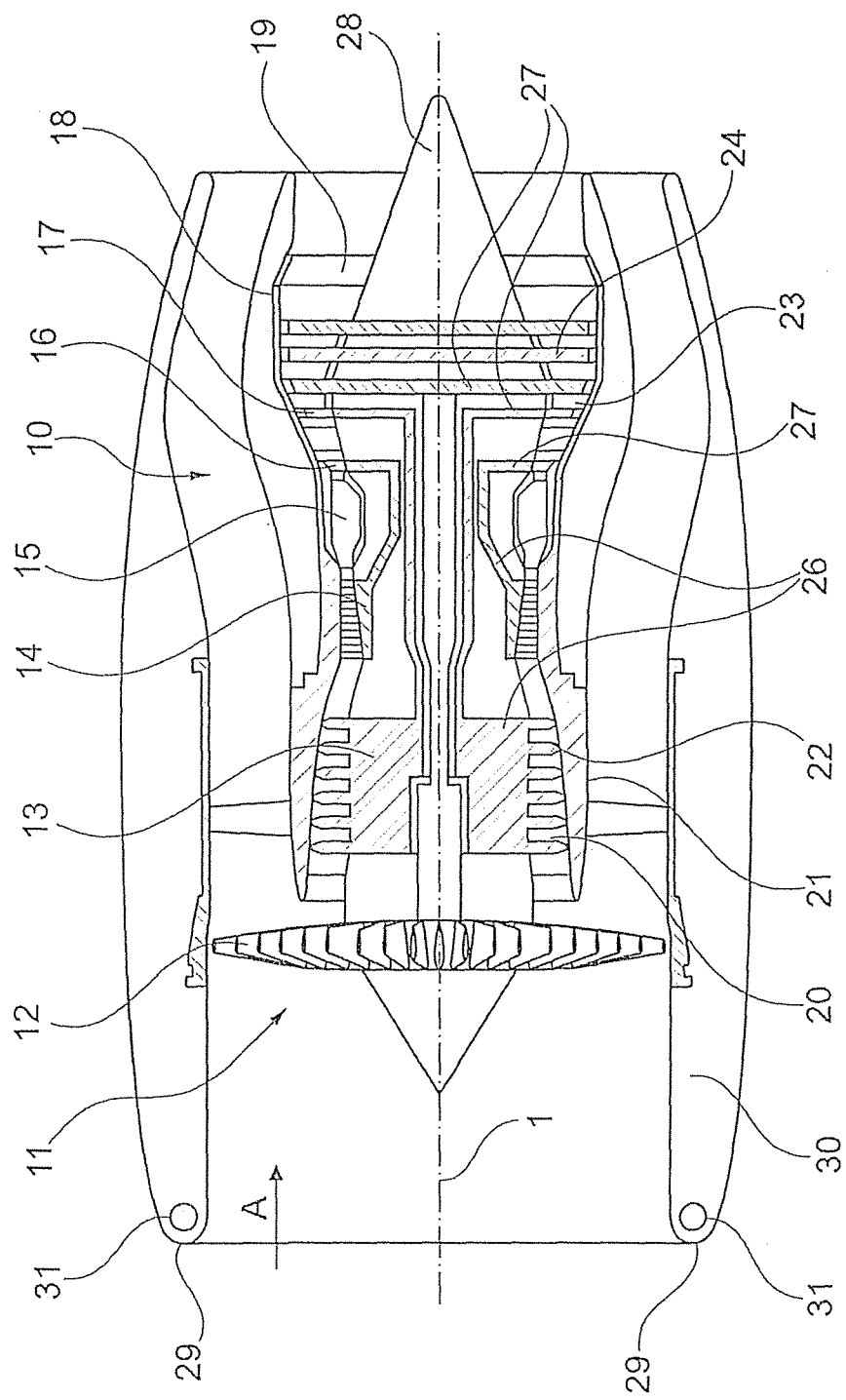

This application claims priority to German Patent Application DE102012000890.2 filed Jan. 18, 2012, the entirety of which is incorporated by reference herein.

This invention relates to a fastening element and its use in a de-icing device of an aircraft gas-turbine engine.

In detail, the invention relates to a fastening element using two components which can be connected to each other such that a given relative movement is possible between the components. An example for this is the connection of two components concentrically to each other which are able to perform a slight relative movement in the radial and axial directions, for example in order to compensate for thermal expansions.

It is known from the state of the art to provide fastening elements which assure, either by a suitable selection of material (elastic bushings or the like) or by design measures (elongated holes, recesses of larger diameter for guide pins of smaller diameter), the required movability with a defined mounting at the same time.

It has proven disadvantageous here that the designs known from the state of the art are expensive to manufacture and assemble while consisting of many individual parts. Parts in contact and in relative movement result in considerable wear, which can lead to loosening or rattling, which considerably shortens the service life of the fastening element overall.

More particularly, the invention relates to a de-icing device arranged in an engine cowling in the inflow region of the latter (inlet).

It is known from the state of the art to attach an annular tube element within a double-walled inflow region of an engine cowling adjacent to an inflow region or an annular lip, into which annular tube element distributes hot air circularly and finally delivers the hot air via impingement holes, thereby heating the wall of the annular lip from the inner side ("piccolo tube" de-icing principle).

Due to its design, an annular tube element of this type has a very large diameter. In combination with the wide variations in temperature involved during the operation envelope of an aircraft gas turbine, this leads to strong thermal expansions and contractions, resulting in high thermal stresses and structure misalignments. These thermal stresses not only affect the annular tube element itself, but also its support. For this reason, the state of the art, as for instance in U.S. Pat. No. 6,079,670, employs very elaborate measures to support the tube element in such a way that the support is not damaged by the thermal expansions or contractions, respectively. This all results in high manufacturing costs and in an overall construction of significant weight, and contributes to malfunctions due to component failure, such as wear, which entails extensive servicing and inspection work.

Furthermore, it must be pointed out that, in respect of the solutions known from the state of the art, very wide temperature differences prevail in the area of the de-icing device during operation of an aircraft gas-turbine engine. During normal cruising, the inflow region of the engine cowling cools down for example to temperatures of −56° C. or colder. If, for example during the landing approach, the de-icing system is then actuated, hot air flows at temperatures between 400° C. and 500° C. through the tube element. Commercially available fastening joints, for example spherical joints, can operate in these temperature ranges only to a very limited extent, or they require a very high design expenditure.

A broad aspect of the present invention is to provide a fastening element of the type specified at the beginning which, while being simply designed and easily and cost-effectively producible, avoids the disadvantages of the state of the art and ensures precise mounting of the components relative to one another.

The object underlying the present invention is furthermore to provide a de-icing device of the type specified at the beginning which, while being simply designed and easily and cost-effectively producible, avoids the disadvantages of the state of the art and which can be provided with a simple mounting.

It is a particular object of the present invention to provide solution to the above problems by a combination of the features described herein. Further advantageous embodiments of the present invention will also become apparent from the present description.

The fastening element in accordance with the invention is thus of lattice-like design and has two struts arranged at an angle to one another. The first strut end areas, spacedly arranged to one another, are fastened to one of the components (inlet) while the other strut end areas are connected to one another and support the other of the two components ("piccolo tube").

This results, in accordance with the invention, in an embodiment having several degrees of freedom, such that thermal changes in dimension or vibrations can be absorbed without the fastening element itself being subjected to excessive stresses which could consequently lead to fracture or failure of the fastening element. The fastening element in accordance with the invention is thus able, as will be described in the following, to absorb and perform several movements, for example movements of an annular tube element of a de-icing device. In so doing, only (programmed) elastic deformations of the fastening element occur, which can take place without material damage and without any risk of a fracture. The fastening element thus has an elasticity sufficient to absorb thermal stresses, for example, but a strength sufficient to withstand vibration stresses. Vibration stresses of this type act in accordance with the invention particularly on the two struts designed as long and thin components and having a sufficient strength. Due to the local strength prevailing in the fastening element, which can be very low in respect of thermal stresses, an elastic deformation can take place without any damage to the fastening element.

The fastening elements, in accordance with the invention, thus supersede the spherical elements known from the state of the art. In the previously known designs, the bending moments or tensile forces must each be absorbed by the spherical connecting elements. This is not the case with the solution in accordance with the invention, since the fastening elements themselves are deformable and hence substitute for the spherical elements known from the state of the art. The bending moments occurring thus have no negative effect on the fastening elements in accordance with the invention.

With regard to the de-icing device, the invention thus provides the possibility of mounting the annular tube element ("piccolo tube") such that it is not hindered by the fastening elements with regard to its thermal expansions and contractions. Hence no stresses occur which could lead to a fracture either of the fastening elements or of the tube element. With regard to the occurring vibrations too, the embodiment in accordance with the invention of the fastening element is operationally reliable to a high degree. There is thus a direct transmission of force from the annular tube element to the area of the engine cowling supporting the tube element. There are no parts in contact with one another that perform a relative movement to each other, such that wear might occur due to this relative movement. The fastening element, in accordance with the invention, is instead wear-free, requires no maintenance and has a long service life. Compared with designs already known from the state of the art, there is a considerable weight reduction of up to ⅔ of the weight of previously known designs. Furthermore, the solution in accordance with the invention is inexpensive and easy to manufacture. The inexpensive producibility of the mounting elements or fastening elements in accordance with the invention results in lower costs for the engine overall. A further advantage is that practically no maintenance work has to be performed during the service life of the engine. This too can result in a considerable reduction of the overall costs.

The fastening element, in accordance with the invention, thus permits a precise concentric and axial positioning of two components while ensuring a limited and predetermined relative movability in several movement directions.

A single and one-piece fastening element is thus created in accordance with the invention which is inexpensive to manufacture and requires only minimum effort for its assembly.

Figure 3:
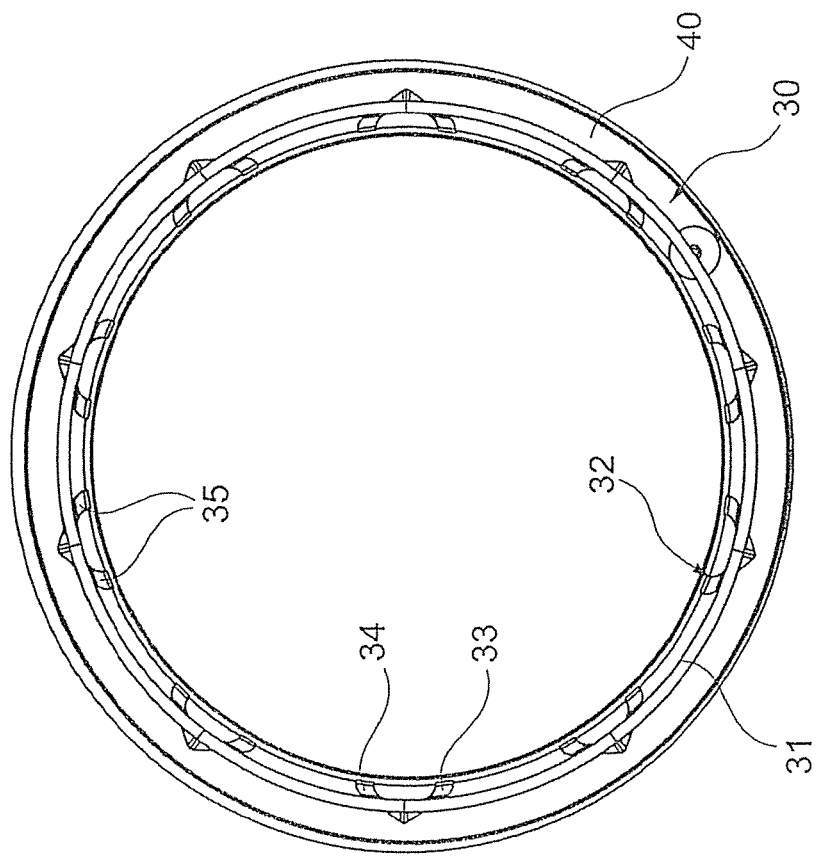

The present invention is described in the following in light of the accompanying drawing, showing an exemplary embodiment. In the drawing, FIG. 1 shows a schematic representation of a gas-turbine engine in accordance with the present invention, FIG. 2 shows a perspective, partially sectional, view of the inflow region/annular lip of an engine cowling with annular tube element and fastening elements in accordance with the present invention, FIG. 3 shows a view, by analogy with FIG. 2, rear side against the flow direction, FIG. 4 shows an enlarged perspective partial view of an exemplary embodiment of the fastening element in accordance with the present invention and of the appertaining tube element, and FIG. 5 shows a simplified side view of the arrangement as per FIG. 4.

Figure 2:
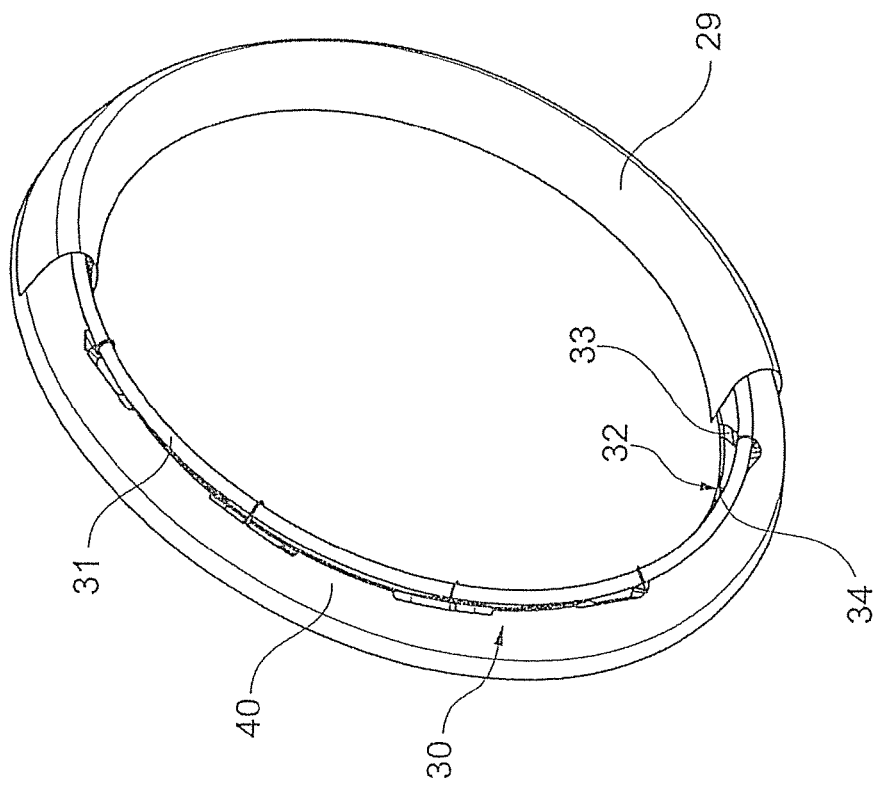

The gas-turbine engine 10 in accordance with FIG. 1 is an example of a turbomachine where the invention can be used. The following however makes clear that the invention can also be used in other turbomachines. The engine 10 is of conventional design and includes in the flow direction, one behind the other, an air inlet 11, a fan 12 rotating inside a casing, an intermediate-pressure compressor 13, a high-pressure compressor 14, combustion chambers 15, a high-pressure turbine 16, an intermediate-pressure turbine 17 and a low-pressure turbine 18 as well as an exhaust nozzle 19, all of which being arranged about a central engine axis 1.

The intermediate-pressure compressor 13 and the high-pressure compressor 14 each include several stages, of which each has an arrangement extending in the circumferential direction of fixed and stationary guide vanes 20, generally referred to as stator vanes and projecting radially inwards from the engine casing 21 in an annular flow duct through the compressors 13, 14. The compressors furthermore have an arrangement of compressor rotor blades 22 which project radially outwards from a rotatable drum or disk 26 linked to hubs 27 of the high-pressure turbine 16 or the intermediate-pressure turbine 17, respectively.

The turbine sections 16, 17, 18 have similar stages, including an arrangement of fixed stator vanes 23 projecting radially inwards from the casing 21 into the annular flow duct through the turbines 16, 17, 18, and a subsequent arrangement of turbine blades 24 projecting outwards from a rotatable hub 27. The compressor drum or compressor disk 26 and the blades 22 arranged thereon, as well as the turbine rotor hub 27 and the turbine rotor blades 24 arranged thereon rotate about the engine axis 1 during operation.

Reference numeral 28 designates an exhaust cone.

Furthermore, the gas-turbine engine has an inflow region 29 (annular lip), which is part of the engine cowling (nacelle) 30.

As is known from the state of the art, an annular tube element 31 is located next to the inflow region 29 inside the double-walled engine cowling 30, said tube element having outlet openings for passing hot air, that is introduced to it, substantially to the inner wall of the inflow region 29, in order to de-ice it.

FIGS. 2 to 4 show on the one hand the fastening element in accordance with the invention and on the other hand its assignment and use to an annular tube element ("piccolo tube") for de-icing of the inflow region 29.

In detail, FIG. 4 shows that the fastening element 32 has two struts 33 and 34 designed as sheet-metal bending parts. Hence, the struts 33 and 34 are relatively long, when compared with their thickness and width, so that they can easily deform elastically in one direction. First end areas 35 are connected to the supporting structure of the engine cowling 30, for example to a wall 40. The connection is made by rivets or bolts, for example. The two struts 33 and 34 are arranged at an angle to one another, and the first end areas 35, spacedly arranged to one another, are provided on a circular path 38 which is arranged concentrically to a central axis 39 of the tube element 31.

As FIGS. 2 and 3 show, several fastening elements 32 in accordance with the invention are provided on the circumference of the tube element 31.

The respective second end areas 36 of the struts 33 and 34 are angled and connected to each other, for example likewise using rivets or bolts. The second end areas 36 support a carrier element 37 which is arranged in a plane vertical to the central axis 39 of the tube element 31. The struts 33 and 34 thus form with their second end areas 36 and the carrier element 37 a three-dimensional lattice structure. The second end areas 36 are, as shown in FIGS. 4 and 5, bent round to the central parts of the two struts 33 and 34. The transition between the respective first end areas 35 and the struts 33 and 34 is also provided with a radius. The result is an overall design of high strength which permits elastic deformations.

FIG. 5 shows by the two arrows elastic deformations of the tube element 31 due to thermal stresses (expansion or contraction). The struts 33 and 34 can deform elastically here, so that no internal material stresses occur which could lead to a fracture. Vibrations or movements along the central axis 39 can be withstood in the area of the second end areas 36, as these are elastically deformable together with the carrier element 37 and absorb the resultant stresses.

The fastening element in accordance with the invention is thus distinguished by a simple structure and a simple design method which can be exactly predetermined by suitable dimensioning and material selection. The wear is minimal in comparison with the state of the art, so that a far longer service life is achieved. There is a considerable cost saving thanks to the lower assembly effort and to the low number of parts. In addition, there is an advantage with regard to weight reduction.

LIST OF REFERENCE NUMERALS

1 Engine axis
10 Gas-turbine engine
11 Air inlet/inflow region
12 Fan rotating inside the casing 13 Intermediate-pressure compressor
14 High-pressure compressor
15 Combustion chambers
16 High-pressure turbine
18 Intermediate-pressure turbine
18 Low-pressure turbine
19 Exhaust nozzle
20 Guide vanes
21 Engine casing
22 Compressor rotor blades
23 Stator vanes
24 Turbine blades
26 Compressor drum or disk
27 Turbine rotor hub
28 Exhaust cone
29 Inflow region/annular lip
30 Engine cowling (nacelle)
31 Tube element
32 Fastening element
33 Strut
34 Strut
35 First end area
36 Second end area
37 Carrier element
38 Circular path
39 Central axis
40 Wall

What is claimed is:

1. A de-icing device of an aircraft gas-turbine engine with an engine cowling enclosing at least one inflow region, with the engine cowling having a double-walled design, comprising:
   at least one annular tube element extending in a circumferential direction and including outlet openings for passing hot air to an inflow region of the gas turbine engine, in order to de-ice the inflow region;
   a plurality of fastening elements mounting the tube element to the engine cowling in the circumferential direction;
   each fastening element including two struts, each strut including a first end area for mounting to the engine cowling and a second end area connected to the tube element, wherein the two first end areas are spaced apart from one another in the circumferential direction along a central axis of the tube element, and the two second end areas are connected to each other, such that the two struts form an angle to each other with respect to the central axis of the tube element; each fastening element thereby providing relative movability of the tube element with respect to the engine cowling.

2. The de-icing device in accordance with claim 1, wherein the first end areas are provided on a circular path which is arranged concentrically to the central axis of the tube element.

3. The de-icing device in accordance with claim 2, and further comprising a carrier element connecting the second end areas to each other and to the tube element.

4. The de-icing device in accordance with claim 3, wherein the tube element is elastically connected to the carrier element.

5. The de-icing device in accordance with claim 4, wherein the carrier element is arranged in a plane vertical to the central axis of the tube element.

6. The de-icing device in accordance with claim 5, wherein the two struts are in a form of flat sheet-metal strips.

7. The de-icing device in accordance with claim 3, wherein the tube element is fixedly connected to the carrier element.

8. The de-icing device in accordance with claim 3, wherein the two struts provide a cantilever mounting of each fastening element with respect to the engine cowling.

9. The de-icing device in accordance with claim 2, wherein the two struts provide a cantilever mounting of each fastening element with respect to the engine cowling.

10. The de-icing device in accordance with claim 7, wherein the carrier element is arranged in a plane vertical to the central axis of the tube element.

11. The de-icing device in accordance with claim 10, wherein the two struts are elastically bendable.

12. The de-icing device in accordance with claim 1, and further comprising a carrier element connecting the second end areas to each other and to the tube element.

13. The de-icing device in accordance with claim 12, wherein the tube element is fixedly connected to the carrier element.

14. The de-icing device in accordance with claim 13, wherein the carrier element is arranged in a plane vertical to the central axis of the tube element.

15. The de-icing device in accordance with claim 14, wherein the two struts are elastically bendable.

16. The de-icing device in accordance with claim 12, wherein the tube element is elastically connected to the carrier element.

17. The de-icing device in accordance with claim 16, wherein the carrier element is arranged in a plane vertical to the central axis of the tube element.

18. The de-icing device in accordance with claim 17, wherein the two struts are in a form of flat sheet-metal strips.

19. The de-icing device in accordance with claim 1, wherein the two struts are elastically bendable.

20. The de-icing device in accordance with claim 1, wherein the two struts provide a cantilever mounting of each fastening element with respect to the engine cowling.

* * * * *